(12) United States Patent
Yang

(10) Patent No.: US 11,777,615 B2
(45) Date of Patent: Oct. 3, 2023

(54) ULTRASONIC PROCESSING METHOD, ELECTRONIC DEVICE, AND COMPUTER-READABLE MEDIUM

(71) Applicant: GUANGDONG OPPO MOBILE TELECOMMUNICATIONS CORP., LTD., Guangdong (CN)

(72) Inventor: Hai Yang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 63 days.

(21) Appl. No.: 17/559,929

(22) Filed: Dec. 22, 2021

(65) Prior Publication Data

US 2022/0116123 A1   Apr. 14, 2022

Related U.S. Application Data

(63) Continuation of application No. PCT/CN2020/103216, filed on Jul. 21, 2020.

(30) Foreign Application Priority Data

Jul. 31, 2019  (CN) .......................... 201910702602.4

(51) Int. Cl.
*H04B 11/00* (2006.01)
*G01S 3/80* (2006.01)
(52) U.S. Cl.
CPC ............... *H04B 11/00* (2013.01); *G01S 3/80* (2013.01)
(58) Field of Classification Search
CPC . H04B 11/00; G01S 3/80; G01S 15/04; G01S 15/32; G01S 15/586; G01S 15/62;
(Continued)

(56) References Cited

U.S. PATENT DOCUMENTS

| 2011/0181510 A1 | 7/2011 | Hakala et al. |
| 2012/0286965 A1 | 11/2012 | Rautiainen |
| 2022/0116123 A1* | 4/2022 | Yang ................... G01S 15/32 |

FOREIGN PATENT DOCUMENTS

| CN | 101312600 | 11/2008 |
| CN | 104219392 | 12/2014 |

(Continued)

OTHER PUBLICATIONS

EPO, Extended European Search Report for EP Application No. 20846583.1, dated Jul. 25, 2022.
CNIPA, First Office Action for CN Application No. 201910702602. 4, dated Jul. 17, 2020.

(Continued)

*Primary Examiner* — Daniel Pihulic
(74) *Attorney, Agent, or Firm* — Hodgson Russ LLP

(57) ABSTRACT

Disclosed are an ultrasonic processing method and apparatus, an electronic device, and a computer-readable medium, wherein same relate to the technical field of mobile terminals. The method includes: when it is monitored that an electronic device outputs a ringing sound, acquiring audio data of an ultrasonic signal received by an ultrasonic receiving apparatus, wherein the ultrasonic signal is a signal that is transmitted by an ultrasonic transmitting apparatus and returned after same is reflected by an object; determining, according to the audio data, a change in the distance between the electronic device and the object; and adjusting the volume of the ringing according to the change in the distance.

19 Claims, 8 Drawing Sheets

(58) Field of Classification Search
CPC .... G01S 15/88; G01S 15/08; H04M 1/72484; H04M 1/72454; H04M 19/047; H04M 19/042; H04M 1/72448; H04M 2250/12
See application file for complete search history.

(56) References Cited

FOREIGN PATENT DOCUMENTS

| | | | | |
|---|---|---|---|---|
| CN | 104811862 | | 7/2015 | |
| CN | 104822174 | | 8/2015 | |
| CN | 105959793 | | 9/2016 | |
| CN | 106980486 | | 7/2017 | |
| CN | 107743704 | | 2/2018 | |
| CN | 107894839 | | 4/2018 | |
| CN | 108874359 | | 11/2018 | |
| CN | 110519450 | | 11/2019 | |
| CN | 110519450 B | * | 4/2021 | ............. G01S 15/08 |
| CN | 110418023 B | * | 8/2021 | ............. G01S 15/08 |
| EP | 3979611 A1 | * | 4/2022 | ............. G01S 15/08 |
| JP | 2011135551 | | 7/2011 | |
| KR | 20160125145 | | 10/2016 | |
| WO | WO-2021017855 A1 | * | 2/2021 | ............. G01S 15/08 |
| WO | WO-2021017943 A1 | * | 2/2021 | ............. G01S 15/08 |

OTHER PUBLICATIONS

CNIPA, Notification to Grant Patent Right for Invention for CN Application No. 201910702602.4, dated Jan. 19, 2021.
WIPO, International Search Report for PCT/CN2020/103216, dated Oct. 10, 2020.

* cited by examiner

ULTRASONIC PROCESSING METHOD, ELECTRONIC DEVICE, AND COMPUTER-READABLE MEDIUM

CROSS-REFERENCE TO RELATED APPLICATIONS

The present application is a continuation of International Patent Application No. PCT/CN2020/103216, filed Jul. 21, 2020, which claims priority to Chinese Patent Application No. 201910702602.4, filed Jul. 31, 2019, the entire disclosures of which are incorporated herein by reference.

TECHNICAL FIELD

The present application relates to the technical field of mobile terminals, and in particular, to an ultrasonic processing method, an electronic device, and a computer-readable storage medium.

BACKGROUND

Mobile terminals, such as mobile phones, are used more and more commonly in life. When a smart terminal device is ringing, the mobile terminal must be operated to stop ringing.

SUMMARY OF THE DISCLOSURE

In a first aspect, an embodiment of the present application provides an ultrasonic processing method performed by an electronic device, wherein the electronic device comprises an ultrasonic transmitting apparatus and an ultrasonic receiving apparatus, and the method comprises: in response to monitoring that the electronic device outputs ringing, acquiring audio data of an ultrasonic signal received by the ultrasonic receiving apparatus, wherein the ultrasonic signal is a signal that is transmitted by the ultrasonic transmitting apparatus and returns after being reflected by an object; determining a change of a distance between the electronic device and the object according to the audio data; and adjusting a volume of the ringing according to the change of the distance.

In a second aspect, an embodiment of the present application further provides an electronic device comprising one or more processor, a memory, an ultrasonic transmitting apparatus and an ultrasonic receiving apparatus, and one or more application program; wherein the one or more application program is stored in the memory and configured to be executed by the one or more processor, and the one or more application program is configured to execute the above method.

In a third aspect, an embodiment of the present application further provides a non-transitory computer-readable storage medium, the non-transitory computer-readable storage medium stores program codes therein, wherein the program codes can be called by a processor to execute the above method.

BRIEF DESCRIPTION OF THE DRAWINGS

In order to describe technical solutions in embodiments of the present application more clearly, drawings required being used in description of the embodiments will be simply introduced below. Obviously, the drawings in the following description are merely some embodiments of the present application. For one of ordinary skill in the art, it is also possible to obtain other drawings according to these drawings without paying any creative work.

DETAILED DESCRIPTION

In order to make those skilled in the art understand the solution of the present application better, technical solutions of embodiments of the present application will be described clearly and completely below in combination with drawings of embodiments of the present application.

Figure 1:
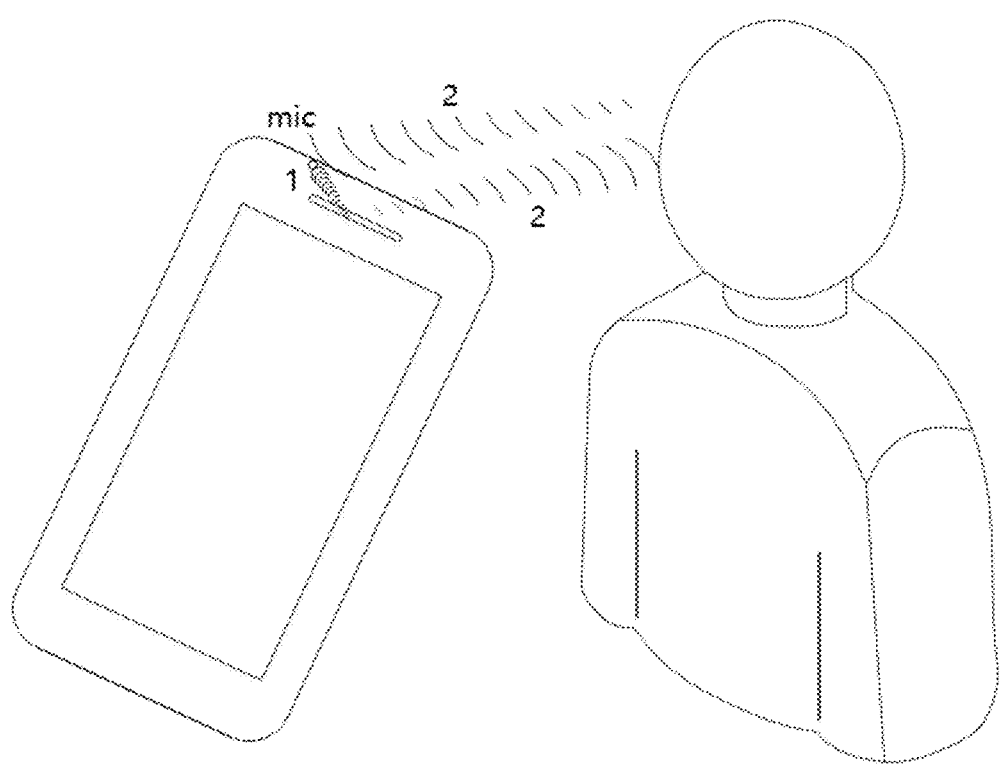
FIG. 1 shows a schematic view of a transmission path of ultrasonic wave provided by an embodiment of the present application.
Figure 2:
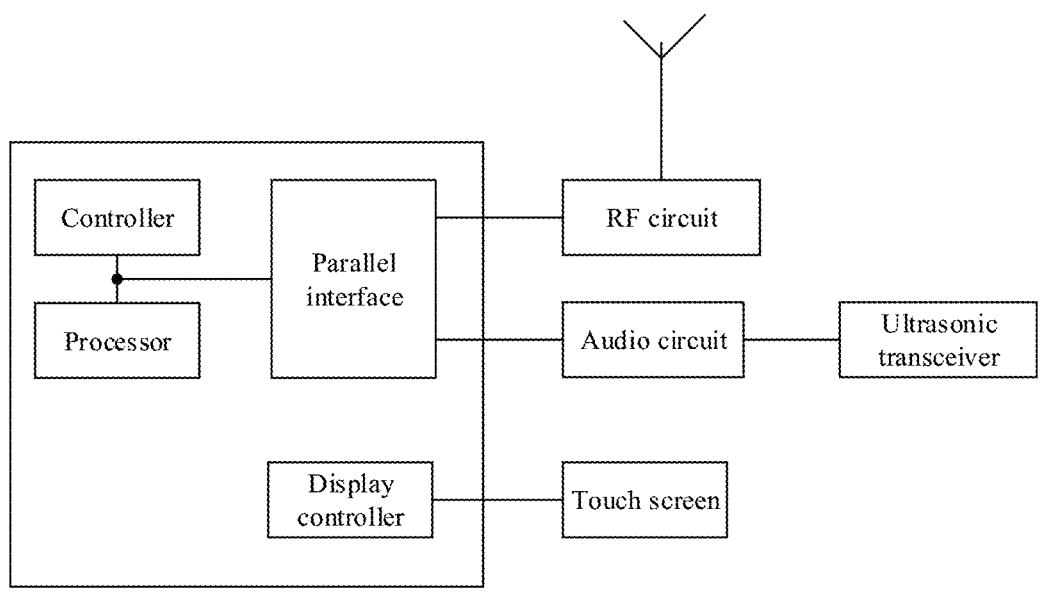
FIG. 2 shows a schematic diagram of processes of transmitting and receiving ultrasonic wave and processing data provided by an embodiment of the present application.

With popularity of full-screen design of mobile terminals, in order to save top space of mobile terminals, more manufacturers have adopted ultrasonic proximity monitoring solutions in mobile terminals to replace traditional infrared proximity detection solutions. A mobile terminal transmits ultrasonic wave through an ultrasonic transmitting apparatus (such as an earpiece, a speaker, a special ultrasonic transmitter, etc.), one part of the ultrasonic wave travels through the air and directly reaches an ultrasonic receiving apparatus (pickup) (such as the path 1 in FIG. 1), and another part of the ultrasonic wave travels through the air, forms reflection on an object, and then reaches the ultrasonic receiving apparatus (such as the path 2 in FIG. 1). What the ultrasonic receiving apparatus picks up is a superimposed signal of direct sound and reflected sound, as shown in FIG. 2, which is converted into an audio signal by an A/D converter in an audio circuit. The audio data is processed by an algorithm to obtain a moving state of the object relative to the mobile terminal, and then a display screen of the mobile terminal is instructed to be in a screen-on state or a screen-off state.

Specifically, when it is monitored that the mobile terminal is in a talking state, an ultrasonic signal with a fixed frequency can be sent through the ultrasonic transmitting apparatus built in the mobile terminal. It can be understood that one part of the ultrasonic signal sent by the ultrasonic transmitting apparatus travels through the air and directly reaches the ultrasonic receiving apparatus, and another part travels through the air, forms reflection on an object, and then reaches the ultrasonic receiving apparatus. The ultrasonic receiving apparatus picks up a superimposed signal of direct sound and reflected sound, which is converted into an audio signal through A/D conversion, wherein the object may include a person face, a human body, etc. For example, as shown in FIG. 2, an ultrasonic signal with a fixed frequency is sent through an earpiece, a speaker, or a special ultrasonic transmitter built in the mobile terminal, one part of the ultrasonic signal travels through the air and directly reaches the pickup, and another part travels through the air, forms reflection on the object, and then reaches the pickup. The pickup picks up a superimposed signal of the direct sound and the reflected sound, which is converted into an audio signal by A/D conversion.

The inventor has found in research that: at present, when a mobile terminal is ringing, it often requires a user to manually operate the mobile terminal, for example, click a volume adjustment button of the mobile terminal, to adjust or turn off the ringing. In addition, it is also possible to implement ringing control of the terminal by the manner of detecting the change of gravity by the mobile terminal. Specifically, the smart terminal starts ringing when a call comes; a user picks up the smart terminal, and gravity detection starts at this time; when a change of gravity is detected, a system mutes the ringing, and a screen still displays the coming call. Thus, both the above two methods require the user to operate and touch the mobile terminal, for example, press a volume key of the mobile terminal, which results in inconvenience for the user to operate.

Figure 3:
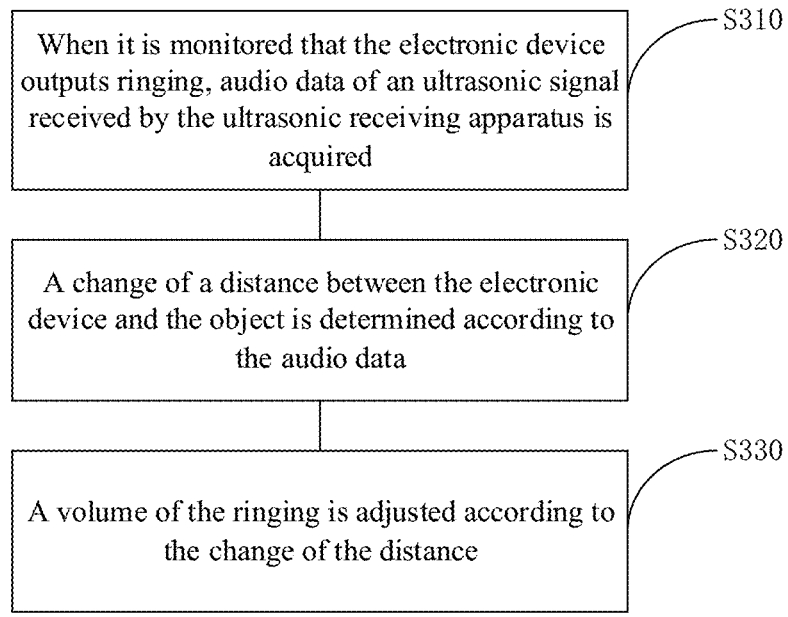
FIG. 3 shows a method flow chart of an ultrasonic processing unit provided by an embodiment of the present application.

Therefore, in order to solve the above defect, as shown in FIG. 3, an embodiment of the present application provides an ultrasonic processing method performed by an electronic device, the electronic device includes an ultrasonic transmitting apparatus and an ultrasonic receiving apparatus, wherein the ultrasonic transmitting apparatus can be a built-in earphone, speaker, or special ultrasonic transmitter, and the ultrasonic receiving apparatus can be a pickup. Specifically, the method includes S310-S330.

S310: when it is monitored that the electronic device outputs ringing, audio data of an ultrasonic signal received by the ultrasonic receiving apparatus is acquired.

Among them, the ultrasonic signal is a signal that is transmitted by the ultrasonic transmitting apparatus and returns after being reflected by an object.

In this embodiment of the present application, the electronic device can perform operations of controlling the ultrasonic transmitting apparatus to send an ultrasonic signal, and receiving an ultrasonic signal returned by the ultrasonic signal after encountering an object through the ultrasonic receiving apparatus based on a request. As an implementation manner, it may be a trigger request input by a user, for example, an instruction input by a user by operating a physical key of the electronic device or a display interface on the electronic device. Specifically, it is possible that the user determines to obtain the request when answering a call. Thus, one implementation manner of sending an ultrasonic signal through the ultrasonic transmitting apparatus, and receiving an ultrasonic signal returned by the ultrasonic signal after encountering an object through the ultrasonic receiving apparatus may be: when the mobile terminal is in a call state, sending an ultrasonic signal through the ultrasonic transmitting apparatus, and receiving an ultrasonic signal returned by the ultrasonic signal after encountering an object through the ultrasonic receiving apparatus.

In an embodiment of the present application, the electronic device outputs ringing in a manner that: before the electronic device enters the call state, it receives an incoming call request, then displays an incoming call answering interface on the screen of the electronic device, and plays ringing according to an initial volume, wherein the initial volume can be a system volume of the electronic device, and can also be a volume set by a user in advance for a call mode.

In this embodiment, the electronic device can monitor incoming or outgoing calls of the electronic device in real time through a built-in monitoring module. When it is monitored that the electronic device is during a Call_START_RINGING incoming call or is dialing and operating an outgoing call, whether the electronic device enters a call state is monitored. Among them, when the electronic device is dialing and operating an outgoing call, a system broadcast will be sent, and the electronic device can use Broadcast Receiver to monitor. In addition, monitoring whether the electronic device is in a call state can be monitoring whether the electronic device is in a call interface after an incoming call or an outgoing call, wherein, when it is monitored that the electronic device is in a call (CALL_STATE_OFFHOOK), it can be determined that the electronic device is in a call state.

In some embodiments, when it is monitored that the electronic device outputs ringing, an ultrasonic signal with a fixed frequency can be sent through the ultrasonic transmitting apparatus built in the electronic device. It can be understood that one part of the ultrasonic signal sent by the ultrasonic transmitting apparatus travels through the air and directly reaches the ultrasonic receiving apparatus, and another part travels through the air, forms reflection on an object, and then reaches the ultrasonic receiving apparatus. The ultrasonic receiving apparatus picks up a superimposed signal of direct sound and reflected sound, which is converted into an audio signal through A/D conversion, wherein the object may include a person face, a human body, a hand, etc.

S320: a change of a distance between the electronic device and the object is determined according to the audio data.

Among them, the audio data is data obtained after processing the ultrasonic signal received by the ultrasonic receiving apparatus of the electronic device. Specifically, after the ultrasonic receiving apparatus receives the ultrasonic signal, the ultrasonic signal can be subjected to analog-to-digital conversion, and then the audio signal is obtained. Then amplitude-frequency data is obtained from the audio signal, and the amplitude-frequency data is the audio data. Specifically, the audio data can be obtained through Fourier transformation; and specifically, Fourier transformation is performed for the audio signal to obtain the audio data.

By analyzing the audio data, a change of a distance between the electronic device and the object can be determined. The change of the distance include distance increasing, distance reducing, and distance keeping.

Specifically, in some embodiments, the electronic device includes both the ultrasonic transmitting apparatus and the ultrasonic receiving apparatus. During movement of the ultrasonic transmitting apparatus relative to the object, the essence is that the electronic device moves relative to the object, so that the ultrasonic receiving apparatus also moves relative to the object. According to Doppler-effect, a wavelength of radiation of an object changes due to relative motion of a wave source (mobile terminal) and an observer (object). The Doppler-effect formula is as follows:

$$f' = \left(\frac{v \pm v_0}{v \mp v_s}\right) f \qquad (1)$$

f' is an observed frequency; f is an original emission frequency of an emission source in a medium; v is a transmission speed of a wave in the medium; $v_0$ is a movement speed of an observer, wherein, if the emission source is approached, the front arithmetic symbol is the symbol +, otherwise, is the symbol −; $v_s$ is a movement speed of the emission source, if the observer is approached, the front arithmetic symbol is the symbol −, otherwise, is the symbol +.

Figure 4:
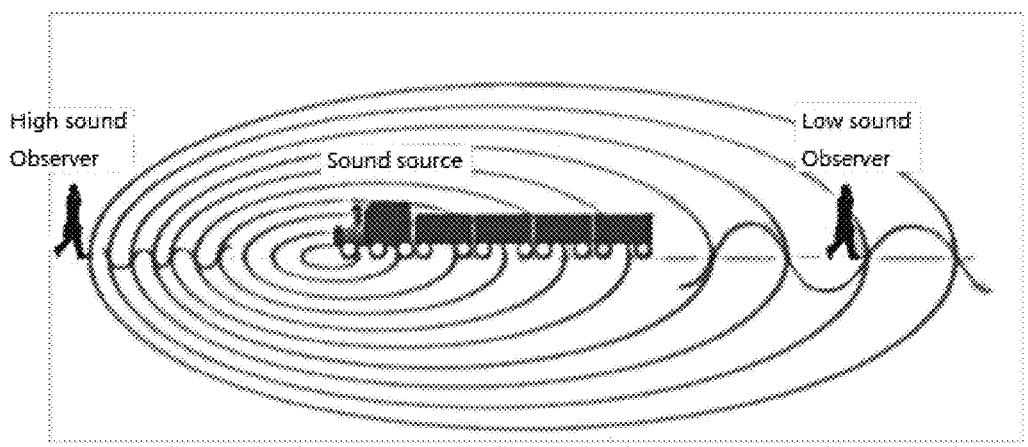
FIG. 4 shows a schematic view of Doppler-effect provided by an embodiment of the present application.

As shown in FIG. 4, from the Doppler-effect formula, it can be known that: when the emission source is relatively closer to the observer, the frequency of the signal received by the observer will increase; when the emission source is relatively farther from the observer, the frequency of the signal received by the observer will decrease; and when the emission source is relatively static to the observer, the frequency of the signal received by the observer will be consistent with that of the emission source.

Therefore, by detecting a relative movement state between the electronic device and the object, a change of a distance between the electronic device and the object can be determined. Specifically, the relative movement state includes relatively approaching, relatively distancing, and relatively static; thus, when it is judged that the relative movement state between the electronic device and the object is relatively approaching, it is determined that a change of a distance between the electronic device and the object is that the distance decreases; when it is judged that the relative movement state between the electronic device and the object is relatively distancing, it is determined that a change of a distance between the electronic device and the object is that the distance increases; and when it is judged that the relative movement state between the electronic device and the object is relatively static, it is determined that a change of a distance between the electronic device and the object is that the distance does not change.

S330: a volume of the ringing is adjusted according to the change of the distance.

Specifically, it is possible that different manners of the change of the distance correspond to different adjusting manners. For example, when the change of the distance is that the distance decreases, the ringing volume is decreased; when the change of the distance is that the distance increases, the ringing volume is increased. Among them, the ringing volume is a volume of sound when the electronic is ringing, and specifically, can be the aforesaid original volume.

As another implementation, it is also possible to decrease the ringing volume when the distance decreases, and not to adjust the ringing volume when the distance increases or does not change. Specifically, it will be introduced in following embodiments.

Therefore, a user can adjust the ringing volume of the electronic device according to a change of a distance between a hand and the electronic device, such that the ringing volume can be adjusted quickly when the user is inconvenient to touch the electronic device.

Figure 5:
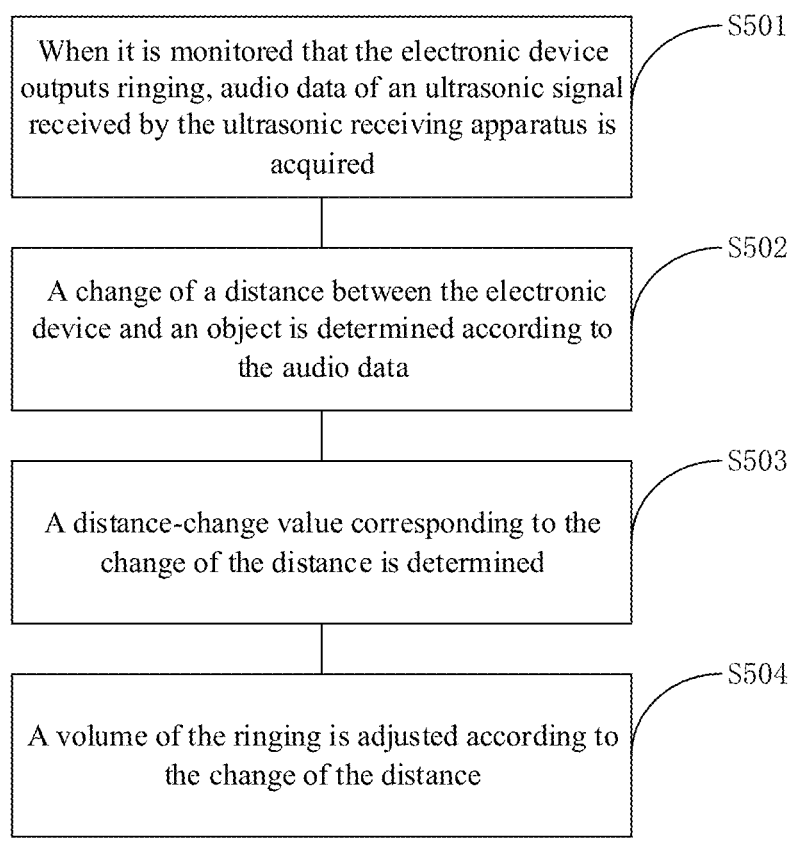
FIG. 5 shows a method flow chart of an ultrasonic processing unit provided by another embodiment of the present application.

As shown in FIG. 5, an embodiment of the present application provides an ultrasonic processing method performed by an electronic device, the electronic device includes an ultrasonic transmitting apparatus and an ultrasonic receiving apparatus, wherein the ultrasonic transmitting apparatus can be a built-in earphone, speaker, or special ultrasonic transmitter, and the ultrasonic receiving apparatus can be a pickup. Specifically, the method includes S501-S504.

S501: when it is monitored that the electronic device outputs ringing, audio data of an ultrasonic signal received by the ultrasonic receiving apparatus is acquired.

S502: a change of a distance between the electronic device and an object is determined according to the audio data.

S503: a distance-change value corresponding to the change of the distance is determined.

Among them, the distance-change value represents a displacement amount between the object and the electronic device under the distance change. As an implementation, the distance between the object and the electronic device can be determined by the ultrasonic signal received by the electronic device after being reflected by the object. Specifically, a moment when the electronic device sends the ultrasonic signal is determined, and a moment when the electronic device acquires the ultrasonic signal reflected back by the object is determined. A propagation time length of the ultrasonic signal can be obtained according to the two moments, and then according to a propagation speed of the ultrasonic signal, the distance between the electronic device and the object can be determined, that is, the propagation speed multiplied by the propagation time length.

Among them, in the situations that the distance becomes smaller and larger, the meaning of the distance between the object and the electronic device represented by the distance-change value is different, that is, when the distance becomes smaller, the distance-change value increases, and when the distance becomes larger, the distance-change value decreases. Specifically, when the distance becomes smaller, the distance-change value is a first value; and when the distance becomes larger, the distance-change value is a second value. Thus the first value and the second value have opposite signs, for example, the first value is a positive number and the second value is a negative number. In some embodiments, the first value and the second value can be obtained by calculation based on multiple ultrasonic signals continuously transmitted and received by the electronic device, or can be preset values, specifically, subsequent embodiments can be referred.

S504: a volume of the ringing is adjusted according to the change of the distance.

Specifically, it is possible to adjust the ringing volume according to a value size corresponding to the distance-change value. Specifically, it is possible that each value corresponds to a value range and each value range corresponding to a volume value, thus when a value range corresponding to a change amplitude is determined, a volume value corresponding to the distance-change value can be determined.

In addition, it is also possible that there is a function relationship between the distance-change value and the ringing volume, and the ringing volume can be determined according to the function relationship and the distance-change value. Moreover, when the distance becomes larger, the distance-change value decreases, and when the distance becomes smaller, the distance-change value increases; specific implementations can refer to subsequent embodiments.

Figure 6:
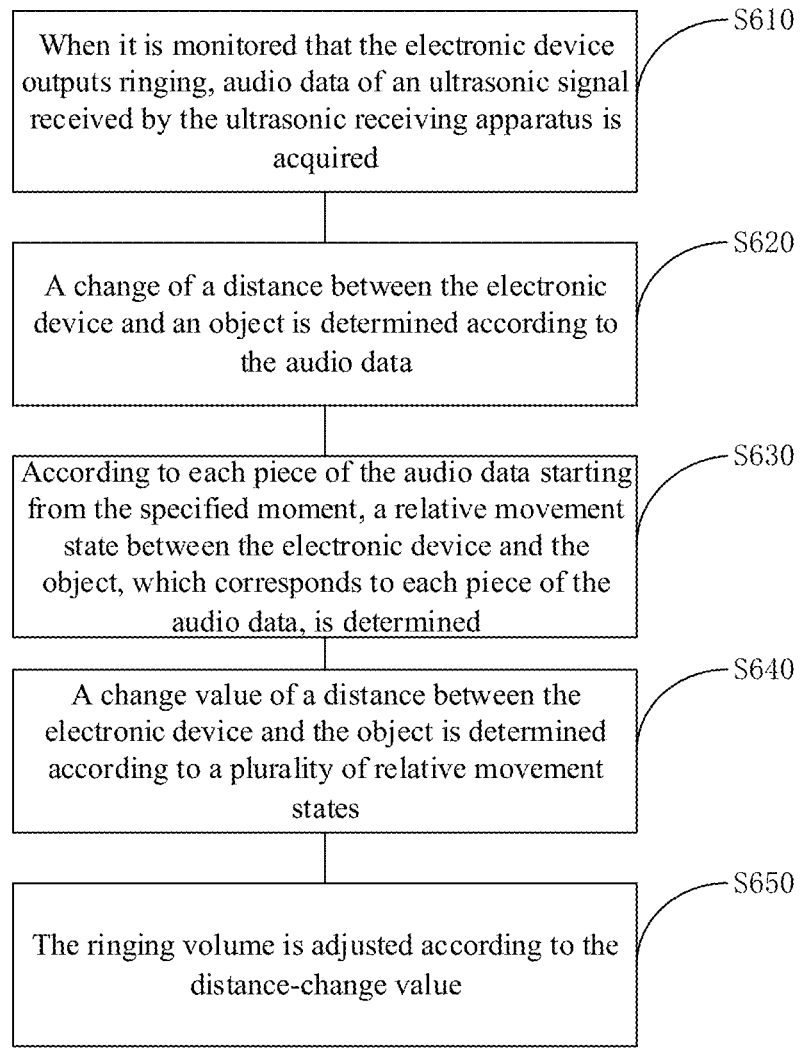
FIG. 6 shows a method flow chart of an ultrasonic processing unit provided by another embodiment of the present application.

As shown in FIG. 6, an embodiment of the present application provides an ultrasonic processing method performed by an electronic device, the electronic device includes an ultrasonic transmitting apparatus and an ultrasonic receiving apparatus, wherein the ultrasonic transmitting apparatus can be a built-in earphone, speaker, or special ultrasonic transmitter, and the ultrasonic receiving apparatus can be a pickup. Specifically, the method includes S610-S650.

S610: when it is monitored that the electronic device outputs ringing, audio data of an ultrasonic signal received by the ultrasonic receiving apparatus is acquired.

S620: a change of a distance between the electronic device and an object is determined according to the audio data.

Specifically, the audio data is audio data of a plurality of ultrasonic signals collected by the ultrasonic receiving apparatus from a specified moment, and the specified moment is a moment when it is monitored that the electronic device outputs ringing.

That is, from the moment when the electronic device outputs ringing, a plurality of pieces of audio data are continuously collected, that is, the ultrasonic transmitting apparatus is controlled to continuously send a plurality of ultrasonic signals according to preset cycles. Thus, the plurality of pieces of audio data sent by the ultrasonic transmitting apparatus of the electronic device are received by the ultrasonic receiving apparatus. Specifically, it is possible to add a filter when the ultrasonic transmitting apparatus sends ultrasonic signals, the filter can filter off ultrasonic signals out of frequency ranges of the ultrasonic signals sent by the ultrasonic transmitting apparatus; in addition, the ultrasonic receiving apparatus directly filters off signals with too small strengths in the received ultrasonic signals, therefore interference of other signals can be avoided.

Furthermore, the electronic device can determine a relative movement state between the electronic device and an object according to received ultrasonic signals. Specifically, the following methods can be used.

(I) Time difference method

The ultrasonic transmitting device of the mobile terminal transmits scanning signals in an ultrasonic frequency band at intervals, and the ultrasonic receiving device of the mobile terminal receives reflected and directly reaching ultrasonic signals. The algorithm determines a relative distance between an obstruction and the mobile terminal by comparing time difference of receiving different ultrasonic signals. A relative speed can also be calculated through the relative distance, and a relative movement state between the mobile terminal and the obstruction can be further judged according to the relative distance and the relative speed. However, this method has poor anti-interference ability. When there is some ultrasonic noise interference in the environment, the recognition result may produce large errors.

(II) Phase difference method

The ultrasonic transmitting device of the mobile terminal sends continuous ultrasonic signals. The receiving end determines a phase difference generated by ultrasonic waves reaching the ultrasonic receiving device after being reflected by calculating a correlation index between the transmitted signals and the received signals. A relative distance between the obstruction and the mobile terminal is determined according to the phase difference. A relative speed can also be calculated through the relative distance, and a relative movement state between the mobile terminal and the obstruction can be further judged according to the relative distance and the relative speed. However, this method has poor anti-interference ability. When there is some ultrasonic noise interference in the environment, the recognition result may produce large errors.

(III) Method using a Doppler-effect area difference as an audio feature

By calculating a difference for spectral intensity in frequency ranges above and below an ultrasonic transmission frequency, a Doppler-effect area difference is obtained:

$$doppler\_dif = sum\_up - sum\_low$$

Figure 7:
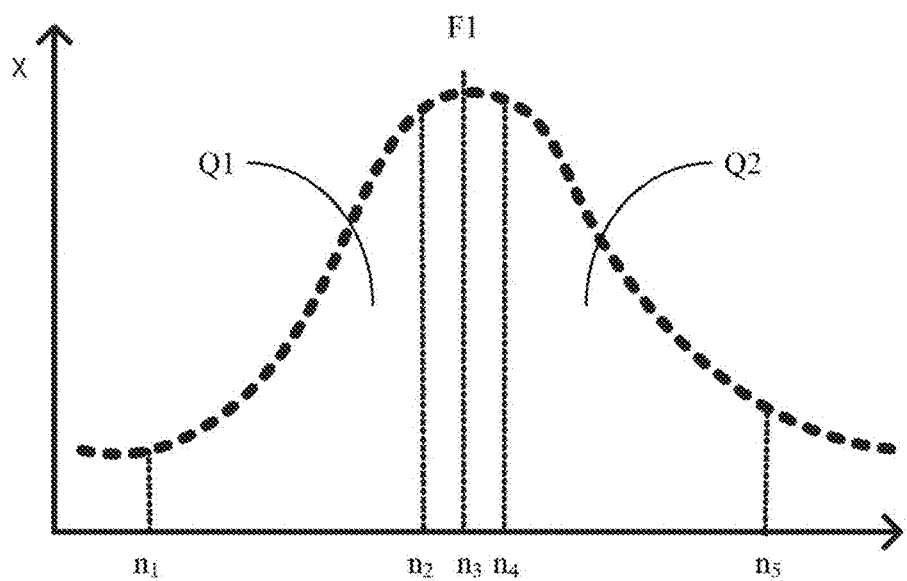
FIG. 7 shows a spectrogram of audio data provided by an embodiment of the application.

As shown in FIG. 7, the Doppler-effect area difference can be obtained by performing feature extraction for received ultrasonic signals. A feature extraction method is to obtain a difference between spectrum intensity in frequency ranges above and below the ultrasonic emission frequency and thereby obtain a spectrum area difference, and the spectrum area difference is the above-mentioned Doppler-effect area difference.

As shown in FIG. 7, it is assumed that an ultrasonic analysis model is set in the electronic device. Specifically, the ultrasonic analysis model can take into account interference noise of the electronic device. The interference noise includes interference noise in ultrasonic frequency bands existing in the device, for example, sensors such as a gyroscope, an acceleration sensor, and so on may emit noise in a ultrasonic frequency band of about 21 KHz and other noise when working. Thus it is possible to better obtain detection results, that is, the relative motion state. Parameters of the ultrasonic analysis model include the maximum relative speed being recognizable by the electronic device, reference emission frequency response of an ultrasonic emission frequency of the electronic device, and so on.

As an implementation, it is assumed that the development of the ultrasonic analysis model (including a feature extraction algorithm and a classification model) has been completed on the electronic device, and the feature extraction algorithm and the classification model have completed training and effect debugging. An ultrasonic emission frequency of electronic device is $f\_ultrspnic$, and an audio sampling rate is $f_s$. From the ultrasonic transmitting apparatus of the electronic device to the ultrasonic receiving apparatus, that is, from an ultrasonic transmitter to a pickup, a size of the frequency response of the entire acoustic loop at $f\_ultrspnic$ is $ultrspnic\_amp$, the maximum relative speed of an obstruction which can be identified by the algorithm is $vmax$, a data length for performing DFT transformation is $fftlen$, a frequency range considered in the algorithm is $[f\_low, f\_up]$, and a frequency point data range used in a DFT transformation result is $[point\_low, point\_up]$, there are n frequency points in total. Thus, the considered frequency range $[f\_low, f\_up]$ is the frequency range of the ultrasonic signal received by the ultrasonic receiving device, and a frequency change interval can be determined based on the transmission frequency and the frequency range. Among them, feature extraction can use a mixture of energy features and DFT, and a classifier can use a support vector machine and the like.

Specifically, as shown in FIG. 7, FIG. 7 shows an audio data spectrogram provided by an embodiment of the present application. Spectrum is an abbreviation of frequency spectrum, which is a frequency distribution curve; for discrete audio data sampling points, it can be obtained through discrete Fourier transformation. In FIG. 7, there is a spectrogram obtained by of a piece of audio data through discrete Fourier transformation, each point on the abscissa corresponds to a real frequency value, and the ordinate represents the signal strength of the frequency.

In some embodiments, a feature extraction module uses a data module with a length of fftlen to perform DFT transformation each time, and thereby obtain a corresponding amplitude-frequency vector X. As shown in FIG. 7, a relationship between an actual frequency $f_n$ and the nth piece of data of the amplitude-frequency vector X is as follows.

$$n = \text{round}\left(\frac{f_n(\text{fftlen}+2)}{f_s}\right)$$

In the above formula, $f_s$ is the sampling rate, X[n] represents intensity of the frequency $f_n$, and ceil represents rounding up.

Thus, a sequence number of a considered key frequency in the amplitude-frequency vector is:

$$\text{point\_mid} = \text{round}\left(\frac{\text{ultrasonic}(\text{fftlen}+2)}{f_s}\right)$$

$$\text{point\_mid\_low} = \text{round}\left(\frac{f\_\text{mid\_low}(\text{fftlen}+2)}{f_s}\right)$$

$$\text{point\_mid\_up} = \text{round}\left(\frac{f\_\text{mid\_up}(\text{fftlen}+2)}{f_s}\right)$$

$$\text{point\_low} = \text{round}\left(\frac{f\_\text{low}(\text{fftlen}+2)}{f_s}\right)$$

$$\text{point\_up} = \text{round}\left(\frac{f\_\text{up}(\text{fftlen}+2)}{f_s}\right)$$

Thus, as shown in FIG. 7, the abscissa n represents frequency points, the ordinate x represents amplitude values corresponding to the frequency points, $n_3$ is a transmission frequency of an ultrasonic signal sent by the ultrasonic transmitting apparatus and is recorded as point_mid, F1 is signal strength corresponding to the transmission frequency of the ultrasonic signal sent by the ultrasonic transmitting apparatus and is recorded as ultrspnic_amp, $n_1$ is a lower limit frequency of a frequency range of an ultrasonic signal received by the ultrasonic receiving apparatus and is recorded as point_low, $n_5$ is an upper limit frequency of the frequency range of the ultrasonic signal received by the ultrasonic receiving apparatus and is recorded as point_up, [$n_2$, $n_4$] is a middle frequency range of the ultrasonic signal received by the ultrasonic receiving apparatus, wherein $n_2$ is a lower limit frequency of the middle frequency range and is recorded as point_mid_low, and $n_4$ is an upper limit frequency of the middle frequency range and is recorded as point_mid_up. Thus, it can be determined that the frequency change interval is a first frequency change interval from point_low to point_mid_low and a second frequency change interval from point_mid_up to point_up.

In some embodiments, the first frequency change interval Q1 and the second frequency change interval Q2 can be determined by the transmission frequency and the frequency range. For example, as shown in FIG. 7, the first frequency change interval is from $n_1$ to $n_1$, and the second first frequency change interval is from $n_4$ to $n_5$.

In some embodiments, after obtaining the frequency change interval, it is possible to obtain an intensity change curve corresponding to the frequency change interval based on the spectrogram, and calculate the Doppler-effect area difference of the ultrasonic signal in the transmission process based on the frequency change interval and the intensity change curve corresponding to the frequency change interval.

Specifically, after obtaining the first frequency change interval, the first intensity change curve corresponding to the first frequency change interval can be obtained based on the spectrogram, and a first area of the ultrasonic signal in the transmission process is calculated based on the first frequency change interval and the first intensity change curve corresponding to the first frequency change interval; and at the same time, after obtaining the second frequency change interval, the second intensity change curve corresponding to the second frequency change interval can be obtained based on the spectrogram, and a second area of the ultrasonic signal in the transmission process is calculated based on the second frequency change interval and the second intensity change curve corresponding to the second frequency change interval. Further, a difference between the first area and the second area is calculated, for example, by subtracting the second area from the first area or subtracting the first area from the second area, the Doppler-effect area difference of the ultrasonic signal in the transmission process is obtained.

When the above-mentioned Doppler-effect area difference is obtained, the relative movement state between the electronic device and the object can be determined based on the Doppler-effect area difference.

Figure 8:
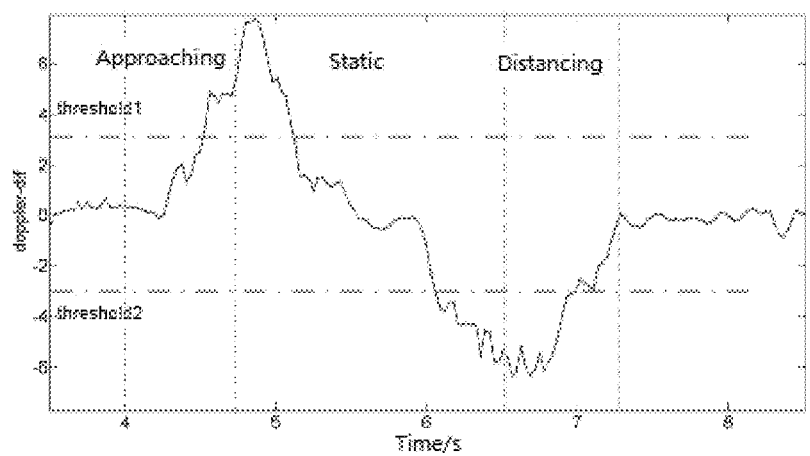
FIG. 8 shows a schematic diagram of change law of doppler_dif during relatively approaching, stationing, and distancing processes of a shielding object and a mobile terminal provided by an embodiment of the present application.

As shown in FIG. 8, different movement states of the obstruction relative to the electronic device can cause regular changes of doppler _dif. When the obstruction approaches the electronic device at a certain speed, doppler _dif obtains a larger positive value; when the obstruction moves away from the electronic device at a certain speed, doppler _dif obtains a smaller negative value; when the obstruction is relatively stationary to the electronic device, doppler _dif obtains a value close to 0.

Further, it is possible to determine the movement state of the obstruction relative to the electronic device by setting positive and negative thresholds. When doppler _dif is larger than threshold 1, a close state is determined; when doppler _dif is smaller than threshold 2, an away state is determined; and when doppler _dif is between threshold 1 and threshold 2, a normal state is determined.

In embodiments of the present application, a specifical implementation manner for the electronic device to obtain the distance change between the electronic device and the object is that: through the above-mentioned Doppler-effect area difference, the relative movement state between the electronic device and the object is determined, and the distance change is determined based on the relative movement state. Specifically, it can refer to the aforementioned embodiments, and is not repeated here.

S630: according to each piece of the audio data starting from the specified moment, a relative movement state between the electronic device and the object, which corresponds to each piece of the audio data, is determined.

Specifically, when each piece of the audio data is acquired, a relative movement state corresponding to each piece of audio data is determined according to the above calculation method. For example, a Doppler-effect area difference corresponding to each piece of audio data is determined, and thus a relative movement state corresponding to each piece of audio data is determined according to the Doppler-effect area difference corresponding to each piece of audio data.

S640: a change value of a distance between the electronic device and the object is determined according to a plurality of relative movement states.

Specifically, each relative movement state can represent the relative movement between the electronic device and the object. It is assumed that a displacement of each movement is a constant, that is, it can be a preset value, and an accumulation process is positive when they are relatively approaching and the accumulation process is negative when they are relatively distancing. For example, when a current distance-change value is A, if it is determined that a currently acquired relative movement state is relatively approaching, the distance-change value is A+C; if it is determined that the currently acquired relative movement state is relatively distancing, the distance-change value is A−C.

As an implementation manner, a method of determining the distance change is to count the number of relatively approaching states and the number of relatively distancing states among a plurality of relative movement states, and then determine the distance-change value according to the two numbers. Specifically, a specific implementation manner for determining the change value of the distance between the electronic device and the object according to the plurality of relative movement states includes: in the plurality of relative movement states, determining a first quantity of pieces of audio data corresponding to the relatively approaching state and a second quantity of pieces of audio data corresponding to the relatively distancing state; determining an approaching amplitude according to the first quantity; determining a distancing amplitude according to the second quantity; and determining the change value of the distance between the electronic device and the object according to the approaching amplitude and the distancing amplitude.

When the electronic device outputs ringing, a moment of monitoring that the electronic device outputs ringing is taken as a start point, that is, a specified moment is taken as a start point, a Doppler-effect area difference doppler_dif of audio data of each received ultrasonic signal is determined, and a relative movement state corresponding to each piece of audio data is determined according to doppler_dif of each piece of audio data, so as to count the number of pieces of audio data corresponding to the relative movement state of relatively approaching, that is, the first quantity, and count the number of pieces of audio data corresponding to the relative movement state of relatively distancing, that is, the second quantity.

For example, the total number of pieces of received audio data is L, wherein the first quantity is M, the second quantity is N, and M+N=L.

Thus, the approaching amplitude is determined according to the first quantity, and the distancing amplitude is determined according to the second quantity.

Specifically, a threshold can set in advance, and the approaching amplitude is determined according to the first quantity and the threshold, for example, a product of the first quantity and the threshold is used as the approaching amplitude. Similarly, the distancing amplitude can also be determined according to the second quantity and the threshold.

Specifically, the approaching amplitude is determined according to the following formula.

$$S1 = M * \text{Sum}_{dif\_min}$$

Among them, S1 is the approaching amplitude, M is the first quantity, and $\text{Sum}_{dif\_min}$ is a volume adjustment threshold.

The distancing amplitude is determined according to the following formula.

$$S2 = N * \text{Sum}_{dif\_min}$$

Among them, S2 is the distancing amplitude, N is the second quantity.

Thus, the change value of the distance between the electronic device and the object is determined according to the following formula.

$$\text{Sum}_{dif} = (M-N) * \text{Sum}_{dif\_min}$$

Among them, $\text{Sum}_{dif}$ is the change value of the distance between the electronic device and the object.

Among them, the volume adjustment threshold is a numerical value set based on actual use habits of users, it can be set based on a speed of a hand of a user approaching the electronic device measured in advance. Therefore, when the movement state of the user relative to the electronic device is relatively approaching, the distance-change value increases; and when the movement state of the user relative to the electronic device is relatively distancing, the distance-change value decreases.

As another implementation manner, the above-mentioned distance-change value may not necessarily have actual meaning of distance length, and can be a kind of counting for the number of times; that is, when a piece of relatively approaching audio data is added each time, the distance-change value increases by one $\text{Sum}_{dif\_min}$; and when a piece of relatively distancing audio data is added each time, the distance-change value decreases by one $\text{Sum}_{dif\_min}$.

Assuming that there is totally 10 pieces of audio data, among them, in the 10 pieces of audio data, 8 pieces of audio data correspond to the relatively approaching state, and 2 pieces of audio data correspond to the relatively distancing state; thus it can be determined that the first quantity is 8, the second quantity is 2, and the determined distance-change value is $6*\text{Sum}_{dif\_min}$.

It should be noted that the determined first quantity, second quantity, and distance-change value can be saved, and when the relative movement state corresponding to the audio data is determined the next time, it will be directly updated on the basis of the saved result. For example, if the relative movement state corresponding to the audio data determined the next time is the relative approaching state, one $\text{Sum}_{dif\_min}$ can be directly added to the distance-change value, that is, the previous $6*\text{Sum}_{dif\_min}$ becomes $7*\text{Sum}_{dif\_min}$.

Therefore, through continuous accumulation, when the user keeps the hand being close to the electronic device, the ringing volume of the electronic device can be gradually reduced until muted, so that the ringing volume of the electronic device gradually decreases as the hand approaches.

S650: the ringing volume is adjusted according to the distance-change value.

Besides that the ringing volume corresponding to the distance-change value can be determined with reference to the above functional relationship, and the ringing volume of the electronic device can be adjusted according to the corresponding ringing volume, it is possible to determine a target volume corresponding to the change value of the distance between the electronic device and the object be according to a preset corresponding relationship between the distance-change value and the volume, and adjust the ringing volume according to the target volume. Specifically, after the target volume is determined, the current ringing volume of the electronic device can be directly adjusted to the target volume.

Among them, the corresponding relationship between the distance-change value and the volume may be an inversely proportional relationship, that is, the larger the distance-change value, the smaller the corresponding target volume, and the smaller the adjusted ringing volume.

Specifically, the corresponding relationship is shown in the following table:

TABLE 1

| Distance-change value | Volume |
| --- | --- |
| $Sum_{dif\_min}$ | $Volume_{ring}$ |
| $2Sum_{dif\_min}$ | $(Volume_{ring})/2$ |
| $4Sum_{dif\_min}$ | $(Volume_{ring})/4$ |
| ... | ... |
| $m*Sum_{dif\_min}$ | 0 |

From Table 1, it can be seen that the preset corresponding relationship between the distance-change value and the volume is as follows.

If the distance-change value is smaller than a maximum threshold, when the distance-change value is $(M-N)*Sum_{dif\_min}$, a volume corresponding to the distance-change value is $Volume_{ring}/(M-N)$.

If the distance-change value is larger than or equal to the maximum threshold, a response volume corresponding to the distance-change value is a mute volume.

For example, in Table 1, when M−N=4, the corresponding target volume is $(Volume_{ring})/4$; when the distance-change value is larger than the maximum threshold, the maximum threshold can be $m*Sum_{dif\_min}$ in Table 1, wherein the value of m can be set according to actual use.

It should be noted that when the distance-change value is equal to the maximum threshold, the target volume is 0, and the current response volume is 0; that is, the ringing volume is set to be the mute volume, and the electronic device is in a mute state.

Thus, after performing adjusting the ringing volume according to the distance change, it is determined whether the ringing volume of the electronic device is the mute volume; if yes, ending the present operation of adjusting the ringing volume according to the distance change; and if the ringing volume is smaller than the mute volume, a next piece of audio data is obtained, it is returned to performing the operation of determining the distance change between the electronic device and the object according to the audio data, and the subsequent operation of adjusting the ringing volume according to the distance change is then executed.

In addition, when the electronic device is muted, the electronic device may still be in a vibrating state. At this time, when it is determined that the ringing volume of the electronic device is set to be the mute volume, it is further determined whether the subsequent distance-change value meets a preset requirement. If meets, the vibration mode of the electronic device is also turned off. Specifically, the preset requirement may be that the distance-change value first increases and then decreases. In other words, the distance change between the electronic device and the object has experienced a trend of first decreasing and then increasing. The vibration mode of the electronic device is turned off at this time, and then after the vibration mode is turned off, if the interval change can be still monitored, and the distance change remains being constant, an incoming call of the electronic device is hung up.

As an implementation manner, it is possible that only when the overall distance change between the electronic device and the object determined according to the received multiple audio data is that the distance change becomes smaller, the ringing volume of the electronic device is adjusted, that is, the ringing volume of the electronic device is reduced; in other words, regarding the overall distance change, relative to the initial position between the electronic device and the object when the electronic device is ringing, only when the distance between the electronic device and the object becomes smaller, the ringing volume of the electronic device is adjusted. In other words, when the electronic device is ringing, it is possible to monitor whether the change of the distance between the electronic device and the object is that the distance becomes smaller; if the situation that the distance becomes smaller occurs, performing collecting multiple audio data is started. The change value of the distance between the electronic device and the object is determined according to the multiple audio data, and then the ringing volume is adjusted.

As another implementation manner, it is also possible that after determining the distance-change value according to the above $Sum_{dif}=(M-N)*Sum_{dif\_min}$, if the distance-change value is a positive number, the ringing volume is adjusted; if it is a negative number or 0, the volume is not adjusted, such that an adjusted ringing volume being louder than the initial volume can be avoided.

Furthermore, according to the above method, when a user gradually moves a hand closer to the electronic device, and the distance between the hand and the electronic device changes back and forth, that is, when it is approaching for a while and distancing for a while, the value of the ringing volume of the electronic device will be caused to be bigger for a while and smaller for a while. Therefore, in order to avoid this situation from occurring, it is possible to only collect the first quantity of pieces of audio data whose relative movement state is relatively approaching, and the distance-change value is determined according to the first quantity; the quantity of pieces of audio data whose relative movement state is relatively distancing is not counted.

Specifically, another kind of implementation manner of determining the distance-change value corresponding to the distance change can be determining the distance-change value caused by distance changes which are distance decreasing, and lowering the ringing volume according to the distance-change value.

Specifically, in the plurality of relative movement states, the first quantity of pieces of audio data corresponding to the relatively approaching state is determined, the approaching amplitude is determined according to the first quantity, and the change value of the distance between the electronic device and the object is determined according to the approaching amplitude. For example, if the approaching amplitude is $M*Sum_{dif\_min}$, the change value of the distance between the electronic device and the object is also $M*Sum_{dif\_min}$.

Taking the above 10 pieces of audio data as an example, wherein, in the 10 pieces of audio data, 8 pieces of audio data correspond to the relatively approaching state, and 2 pieces of audio data correspond to the relatively distancing state, and thus it is possible to determine that the first quantity is 8 and determine that the distance-change value is $8*\text{Sum}_{dif\_min}$. The 2 pieces of relatively distancing audio data are directly discarded.

Figure 9:
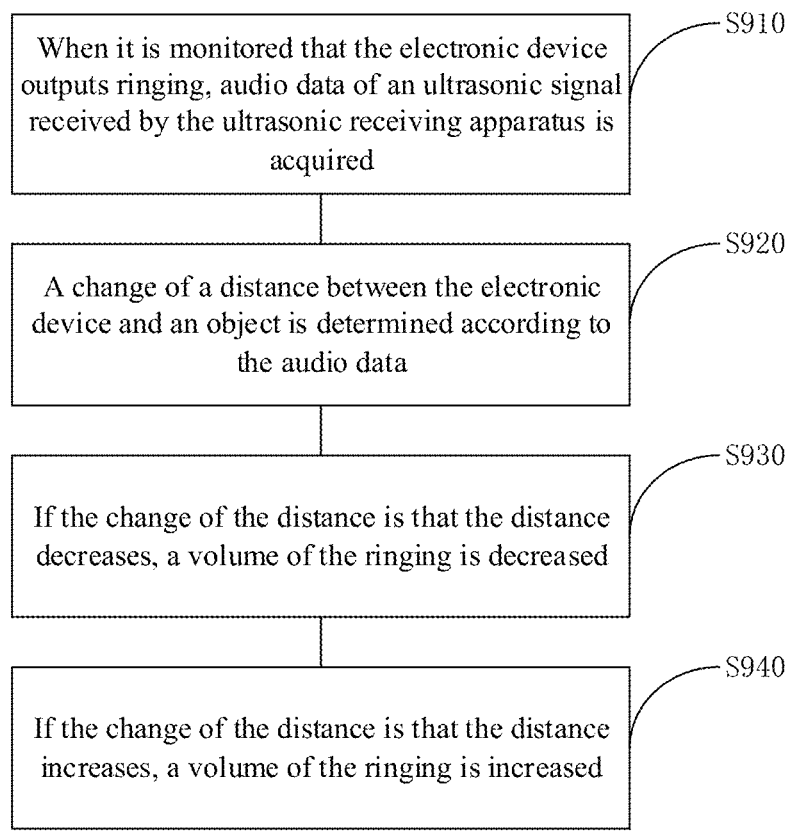
FIG. 9 shows a method flow chart of an ultrasonic processing unit provided by another embodiment of the present application.

As shown in FIG. 9, an embodiment of the present application provides an ultrasonic processing method performed by an electronic device, the electronic device includes an ultrasonic transmitting apparatus and an ultrasonic receiving apparatus, wherein the ultrasonic transmitting apparatus can be a built-in earphone, speaker, or special ultrasonic transmitter, and the ultrasonic receiving apparatus can be a pickup. Specifically, the method includes S910-S940.

S910: when it is monitored that the electronic device outputs ringing, audio data of an ultrasonic signal received by the ultrasonic receiving apparatus is acquired.

S920: a change of a distance between the electronic device and an object is determined according to the audio data.

S930, if the change of the distance is that the distance decreases, a volume of the ringing is decreased.

S940, if the change of the distance is that the distance increases, a volume of the ringing is increased.

As one implementation manner, when a user moves a hand close to the electronic device, the ringing volume can be decreased; and when the hand is being away from the electronic device, the ringing volume is increased. Specifically adjusting methods can refer to the above embodiments.

As another implementation manner, it is possible to refer a movement direction of an object relative to the electronic device, and determine a manner for adjusting the ringing according to the movement direction.

Specifically, the ultrasonic signal reflected by the electronic device can be a kind of audio signal, the audio signal can be reflected by an object and received by an audio collector of the electronic device; thus, the object can be regarded as a sound source. A specific implementation manner is as follows.

The electronic device is provided with an audio collector, the number of the audio collector can be one and can also be multiple; based on the different numbers of the audio collector, methods of determining direction information between a user and the electronic device according to the audio signal are also different.

As an implementation manner, the number of the audio collector is one, it is rotatably connected to the electronic device and can be rotated freely. Specifically, the audio collector is arranged on the above-mentioned rotating component and can rotate under drive of the rotating component. Thus, a method of determining the direction information between the user and the electronic device according to the audio signal includes: changing the terminal rotation component at a certain interval angle and direction, so that the audio collector rotates at a certain interval angle and direction change; recording an audio signal received by the audio collector when rotating to each position, and obtaining a target direction corresponding to an audio signal with the maximum signal strength among all of the received audio signals. Accordingly, it can be determined that the sound source is in the target direction, that is, the direction information between the user and the electronic device can be determined.

Specifically, the above-mentioned method is a sound source positioning method based on the controllable beamforming technology of the maximum output power. Specifically, the beamforming technology is adopted to adjust a receiving direction of a microphone array and scan in the entire receiving space, a direction with the greatest energy is a direction of a sound source.

As another implementation manner, a plurality of audio collectors may be provided on the electronic device, wherein the audio collector may be a microphone unit. As an implementation manner, the provision of a microphone array on the electronic device refers to the arrangement of microphones, that is, a system composed of a certain number of acoustic sensors (usually microphones) and used to sample and process spatial characteristics of a sound field.

In some embodiments, all audio collectors are arranged on a main body of the electronic device. Of course, it is also possible that all audio collectors are arranged on the rotating component of the electronic device. Of course, it is further possible that some of the audio collectors are arranged on the rotating component of the electronic device, and the others of the audio collector is arranged on the main body of the mobile terminal. In order to improve the accuracy of determining the sound source, they can be arranged on the electronic device in a circumferential direction, and specifically, can be arranged on the main body of the electronic device in a circumferential direction. In addition, regarding audio collectors arranged on the rotating component, it is possible to arrange an audio collector on each face of the rotating component, or audio collectors are set on at least two opposite faces.

Specifically, when a plurality of audio collectors are provided, not only can the aforesaid sound source positioning method based on the controllable beamforming technology of the maximum output power be used, but also the technology based on arrival time difference can be used.

Specifically, the sound source positioning method based on the arrival time difference technology is that: since sound waves propagate at a certain speed in the air, phases reaching microphones set at different positions are different; according to phase differences of these microphones recording the same sound, we can calculate time differences for the same sound to reach each pair of microphones. If we get the time difference of a sound sent from a certain sound source reaching a pair of microphones, positions of the microphones can be arranged appropriately so that there is only one intersection point of hyperboloid, and this point is the sound source position required by us. Thus, the located sound source position is the position of the object relative to the electronic device, and the movement direction of the object relative to the electronic device can be determined through multiple positions of the object relative to the electronic device collected multiple times.

If the movement direction is a preset direction and the distance change is distance decreasing, the ringing volume is decreased. If the movement direction is a preset direction and the distance change is distance increasing, the ringing volume is increased.

Figure 10:
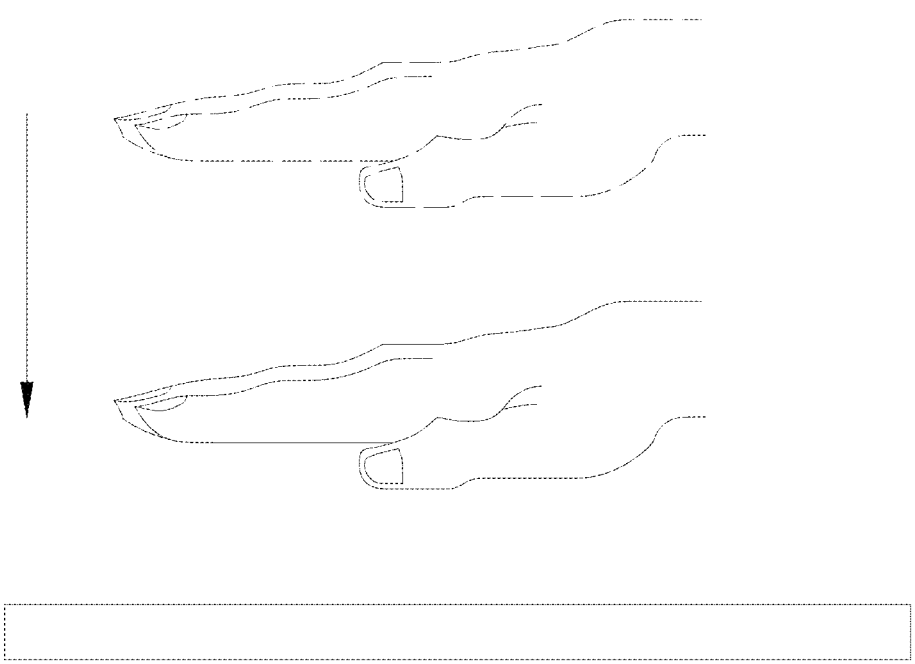
FIG. 10 shows a schematic view of a moving direction of an object relative to an electronic device provided by an embodiment of the present application.

Among them, the preset direction can be a movement direction of the object that is perpendicular to a screen of the electronic device, as shown in FIG. 10, when a palm is approaching the screen of the electronic device along the direction shown in FIG. 10, the electronic device decreases the ringing volume, or directly sets the ringing volume of the electronic device to be a mute volume; and when along a direction being inverse to the arrow in FIG. 10, the palm is distancing from the screen of the electronic device, the electronic device increases the ringing volume.

Figure 11:
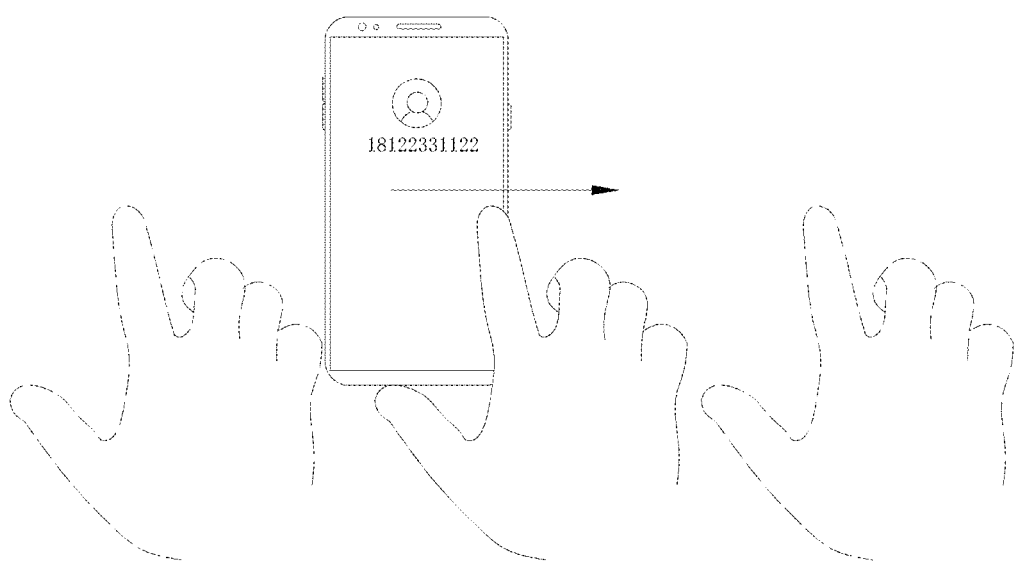
FIG. 11 shows a schematic view of another moving direction of an object relative to an electronic device provided by an embodiment of the present application.

If the movement direction is not the preset direction, it is determined whether the distance change is increased first and then decreased; if so, the ringing volume is set to be the mute volume. As shown in FIG. 11, the movement direction of the hand is from one side edge of the screen to the other side edge, and both the ultrasonic transmitting apparatus and the ultrasonic receiving apparatus of the electronic device are arranged on an opposite face of the screen; thus, when the hand moves from the direction shown in FIG. 11, the ultrasonic receiving apparatus can detect that the hand first approaches and then moves away, that is, whether the distance change is first increased and then decreased, and then the ringing volume can be directly set to be the mute volume.

Figure 12:
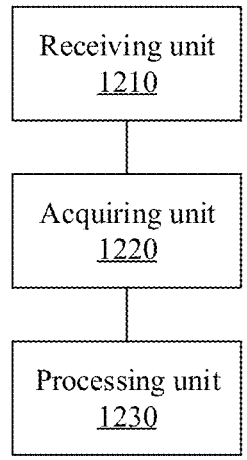
FIG. 12 shows a module block diagram of an ultrasonic processing apparatus provided by an embodiment of the present application.

Referring to FIG. 12, which shows a structural block diagram of an ultrasonic processing apparatus provided by an embodiment of the present application. The apparatus can comprise a receiving unit 1210, an acquiring unit 1220, and a processing unit 1230.

The receiving unit 1210 is configured to: when it is monitored that an electronic device outputs ringing, acquire audio data of an ultrasonic signal received by an ultrasonic receiving apparatus; wherein the ultrasonic signal is a signal that is transmitted by an ultrasonic transmitting apparatus and returns after being reflected by an object.

The acquiring unit 1220 is configured to determine a change of a distance between the electronic device and the object according to the audio data.

The processing unit 1230 is configured to adjust a volume of the ringing according to the change of the distance.

Furthermore, the processing unit 1230 is further configured to determine a distance-change value corresponding to the change of the distance, and adjust the ringing volume according to the distance-change value.

Specifically, the audio data is audio data of a plurality of ultrasonic signals collected by the ultrasonic receiving apparatus from a specified moment, the specified moment is a moment when it is monitored that the electronic device output ringing. The processing unit 1230 is configured to determine a relative movement state of the electronic device and the object corresponding to each piece of audio data according to each piece of audio data from the specified moment, and determine the change value of the distance between the electronic device and the object according to the plurality of relative movement states.

Among them, the relative movement state includes a relatively approaching state and a relatively distancing state; the determining the change value of the distance between the electronic device and the object according to the plurality of relative movement states includes: in the plurality of relative movement states, determining a first quantity of pieces of audio data corresponding to the relatively approaching state and a second quantity of pieces of audio data corresponding to the relatively distancing state; determining an approaching amplitude according to the first quantity; determining a distancing amplitude according to the second quantity; and determining the change value of the distance between the electronic device and the object according to the approaching amplitude and the distancing amplitude.

Specifically, the processing unit 1230 adopts the following method to determine an approaching amplitude according to the first quantity, determine a distancing amplitude according to the second quantity, and determine the change value of the distance between the electronic device and the object according to the approaching amplitude and the distancing amplitude.

The approaching amplitude is determined according to the following formula.

$$S1 = M * \text{Sum}_{dif\_min}$$

Among them, S1 is the approaching amplitude, M is the first quantity, and $\text{Sum}_{dif\_min}$ is a volume adjustment threshold.

The distancing amplitude is determined according to the following formula.

$$S2 - N * \text{Sum}_{dif\_min}$$

Among them, S2 is the distancing amplitude, N is the second quantity.

Thus, the change value of the distance between the electronic device and the object is determined according to the following formula.

$$\text{Sum}_{dif} = (M-N) * \text{Sum}_{dif\_min}$$

Among them, $\text{Sum}_{dif}$ is the change value of the distance between the electronic device and the object.

According to a preset corresponding relationship between the distance-change value and the volume, a target volume corresponding to the change value of the distance between the electronic device and the object is determined, and the ringing volume is adjusted according to the target volume; wherein, the preset corresponding relationship between the distance-change value and the volume is as follows.

If the distance-change value is smaller than the maximum threshold, when the distance-change value is $(M-N) * \text{Sum}_{dif\_min}$, a volume corresponding to the distance-change value is $\text{Volume}_{ring}/(M-N)$.

If the distance-change value is larger than or equal to the maximum threshold, the ringing volume corresponding to the distance-change value is a mute volume.

As another implementation manner, the processing unit 1230 is further configured to: if the distance change is distance decreasing, decrease the ringing volume; and if the distance change is distance increasing, increase the ringing volume.

Specifically, the processing unit 1230 is specifically configured to: acquire a movement direction of the object relative to the electronic device; if the movement direction is a preset direction and the distance change is distance decreasing, decrease the ringing volume; and if the movement direction is a preset direction and the distance change is distance increasing, increase the ringing volume. If the movement direction is not a preset direction, it is determined whether the distance change is first increasing and then decreasing; if yes, the ringing volume is set to be a mute volume.

Those skilled in the art can clearly understand that, for convenience and conciseness of description, specific working processes of the devices and modules described above can refer to corresponding processes in the foregoing method embodiments, which will not be repeated here.

In these embodiments provided by the present application, coupling between the modules may be electrical, mechanical or other forms of coupling.

In addition, each functional module in each embodiment of the present application may be integrated into one processing module, or each module may also exist alone physically, or two or more modules may also be integrated into one module. The above-mentioned integrated modules can be implemented in the form of hardware, and can also be implemented in the form of software functional modules.

Figure 13:
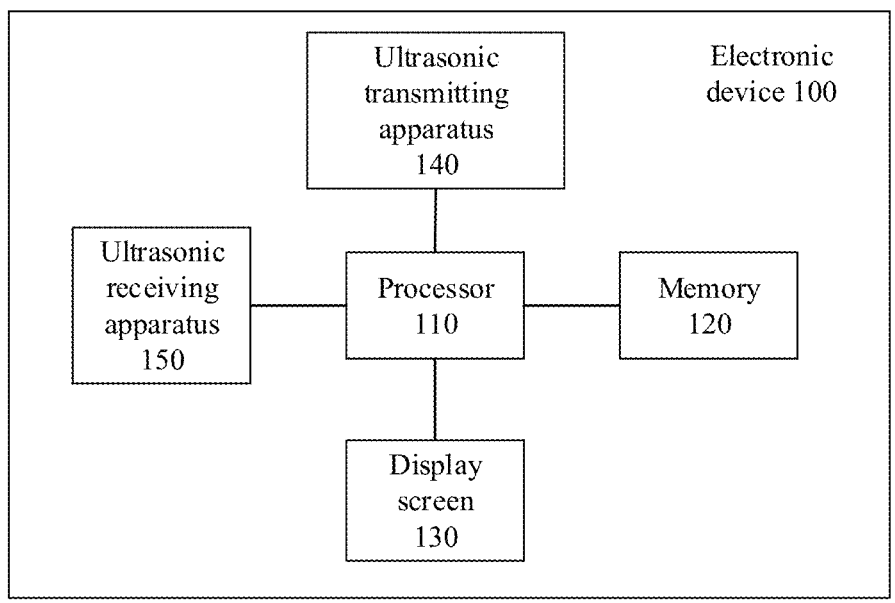
FIG. 13 shows a block diagram of an electronic device of an embodiment of the present application, which is configured to execute an ultrasonic processing method according to an embodiment of the present application.

Referring to FIG. 13, which shows a structural block diagram of an electronic device provided by an embodiment of the present application. The electronic device 100 may be an electronic device capable of running application programs, such as a smart phone, a tablet computer, an e-book, etc. The electronic device 100 of the present application may include one or more of the following components: a processor 110, a memory 120, a display screen 130, an ultrasonic transmitting apparatus 140, an ultrasonic receiving apparatus 150, and one or more application programs, wherein the one or more applications may be stored in the memory 120 and configured to be executed by the one or more processors 110, and the one or more programs are configured to execute the methods described in the foregoing method embodiments.

The processor 110 may include one or more processing cores. The processor 110 uses various interfaces and lines to connect various parts of the entire electronic device 100, and executes various functions of the electronic device 100 and processes data by running or executing instructions, programs, code sets, or instruction sets stored in the memory 120, and calling data stored in the memory 120. Optionally, the processor 110 may adopt at least one kind of hardware forms of digital signal processing (DSP), field-programmable gate array (FPGA), and programmable logic array (PLA) to implement. The processor 110 may be integrated with one or a combination of a central processing unit (CPU), a graphics processing unit (GPU), a modem, and the like. Among them, the CPU mainly processes an operating system, user interfaces, and application programs; the GPU is used for rendering and drawing of display content; and the modem is used for processing wireless communication. It can be understood that the above-mentioned modem may also not be integrated into the processor 110, but be implemented by a single communication chip alone.

The memory 120 may include a random access memory RAM), and may also include a read-only memory. The memory 120 may be used to store instructions, programs, codes, code sets or instruction sets. The memory 120 may include a program storage area and a data storage area, wherein the program storage area may store instructions for implementing an operating system, instructions for implementing at least one function (such as a touch function, a sound playback function, an image playback function, etc.), and instructions used to implement the following various method embodiments, etc. The storage data area can also store data created by the terminal 100 during use (such as a phone book, audio and video data, chat record data), and the like.

The display screen 130 is used to display information input by users, information provided to users, and various graphical user interfaces of the electronic device 100. These graphical user interfaces can be composed of graphics, text, icons, numbers, videos, and any combination thereof. In an example, the display screen 130 may be a liquid crystal display (LCD), and may also be an organic light-emitting diode (OLED), which is not limited here.

Figure 14:
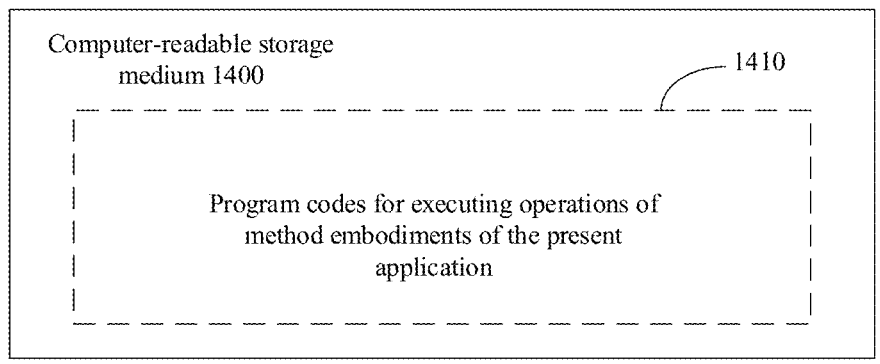
FIG. 14 shows a storage unit of an embodiment of the present application, which is configured to store or carry program codes for implementing an ultrasonic processing method according to an embodiment of the present application.

Referring to FIG. 14, which shows a structural block diagram of a computer-readable storage medium provided by an embodiment of the present application. The computer-readable storage medium stores program codes, and the program codes can be called by a processor to execute the methods described in the above method embodiments.

The computer-readable storage medium 1400 may be an electronic memory such as a flash memory, an EEPROM (Electrically Erasable Programmable Read Only Memory), an EPROM, a hard disk, or an ROM. Optionally, the computer-readable storage medium 1400 includes anontransitory computer-readable storage medium. The computer-readable storage medium 1400 has storage space for the program code 1410 for executing any method steps in the above-mentioned methods. These program codes can be read from one or more computer program products or written into the one or more computer program products. The program code 1410 may be compressed in a suitable form, for example.

In conclusion, in the solutions provided by the present application, when an electronic device is ringing, it can be monitored that the electronic device outputs ringing, and audio data of an ultrasonic signal received by an ultrasonic receiving apparatus is acquired, wherein the ultrasonic signal is a signal that is transmitted by an ultrasonic transmitting apparatus and returns after being reflected by an object; thus, according to the audio data, a change of a distance between the electronic device and the object is determined; and the volume of the ringing is adjusted according to the change of the distance. Therefore, when an electronic device rings, a user can adjust the volume of the ringing by adjusting a change of a distance between a body part (such as the hand) of the user and the electronic device, without needing to touch the electronic device, thereby providing the user with the convenience of handling the volume of the ringing of the electronic device.

It can be adapted to meeting scenes or driving scenes very well. For example, during a meeting, a terminal device is generally static on the desktop. When an incoming call rings, it only needs to put a hand close to the terminal device, and the terminal device will automatically adjust the ringing volume.

Finally, it should be noted that the above embodiments are only intended to illustrate technical solutions of the present application, but not to limit them; although the present application has been described in detail with reference to the foregoing embodiments, those of ordinary skill in the art should understand: it is still possible to modify the technical solutions described in the foregoing embodiments, or equivalently replace some technical features therein; these modifications or replacements do not drive the essence of the corresponding technical solutions to deviate from the spirit and scope of the technical solutions of the embodiments of the present application.

What is claimed is:

1. An ultrasonic processing method performed by an electronic device, wherein the electronic device comprises an ultrasonic transmitting apparatus and an ultrasonic receiving apparatus, and the method comprises:
   in response to monitoring that the electronic device outputs ringing, acquiring audio data of an ultrasonic signal received by the ultrasonic receiving apparatus, wherein the ultrasonic signal is a signal that is transmitted by the ultrasonic transmitting apparatus and returns after being reflected by an object;
   determining a change of a distance between the electronic device and the object according to the audio data; and
   adjusting a volume of the ringing according to the change of the distance;
   wherein adjusting the volume of the ringing according to the change of the distance comprises:
      determining a distance-change value corresponding to the change of the distance; and
      adjusting the volume of the ringing according to the distance-change value, comprising:
         determining a target volume corresponding to the change value of the distance between the electronic device and the object according to a preset corresponding relationship between the distance-change value and the volume, and adjusting the volume of the ringing according to the target volume.

2. The method according to claim 1, wherein the audio data is audio data of a plurality of ultrasonic signals collected by the ultrasonic receiving apparatus from a specified moment, and the specified moment is a moment when it is monitored that the electronic device outputs ringing;
the determining a distance-change value corresponding to the change of the distance comprises:
determining a relative movement state between the electronic device and the object corresponding to each piece of the audio data according to each piece of the audio data starting from the specified moment; and
determining a change value of a distance between the electronic device and the object according to a plurality of relative movement states.

3. The method according to claim 2, wherein the relative movement states comprise a relatively approaching state and a relatively distancing state, and the determining a change value of a distance between the electronic device and the object according to a plurality of relative movement states comprises:
in the plurality of relative movement states, determining a first quantity of pieces of audio data corresponding to the relatively approaching state and a second quantity of pieces of audio data corresponding to the relatively distancing state;
determining an approaching amplitude according to the first quantity;
determining a distancing amplitude according to the second quantity; and
determining the change value of the distance between the electronic device and the object according to the approaching amplitude and the distancing amplitude.

4. The method according to claim 3, further comprising:
saving the determined first quantity, second quantity, and change value of the distance between the electronic device and the object; and
in response to determining the relative movement state corresponding to the audio data a next time, directly updating the first quantity, the second quantity, and the change value of the distance between the electronic device and the object on a basis of the saved determination.

5. The method according to claim 3, wherein the determining an approaching amplitude according to the first quantity, determining a distancing amplitude according to the second quantity, and determining the change value of the distance between the electronic device and the object according to the approaching amplitude and the distancing amplitude comprises:
determining the approaching amplitude according to the following formula:

$$S1 = M * \text{Sum}_{dif\_min}$$

wherein S1 is the approaching amplitude, M is the first quantity, and $\text{Sum}_{dif\_min}$ is a volume adjustment threshold;
determining the distancing amplitude according to the following formula:

$$S2 = -N * \text{Sum}_{dif\_min}$$

wherein S2 is the distancing amplitude, and N is the second quantity; and
determining the change value of the distance between the electronic device and the object according to the following formula:

$$\text{Sum}_{dif} = (M-N) * \text{Sum}_{dif\_min}$$

wherein $\text{Sum}_{dif}$ is the change value of the distance between the electronic device and the object.

6. The method according to claim 5, wherein the preset corresponding relationship between the distance-change value and the volume comprises:
in response to the distance-change value being smaller than a maximum threshold, when the distance-change value is $(M-N)*\text{Sum}_{dif\_min}$, a volume corresponding to the distance-change value is $\text{Volume}_{ring}/(M-N)$; and
in response to the distance-change value being larger than or equal to the maximum threshold, a response volume corresponding to the distance-change value is a mute volume.

7. The method according to claim 3, wherein the determining a change value of a distance between the electronic device and the object according to a plurality of relative movement states comprises:
in the plurality of relative movement states, determining a first quantity of pieces of audio data corresponding to the relatively approaching state;
determining an approaching amplitude according to the first quantity; and
determining the change value of the distance between the electronic device and the object according to the approaching amplitude.

8. The method according to claim 2, wherein the determining a relative movement state between the electronic device and the object corresponding to each piece of the audio data according to each piece of the audio data starting from the specified moment comprises:
acquiring a Doppler-effect area difference corresponding to each piece of the audio data; and
determining a relative movement state corresponding to each piece of the audio data according to the Doppler-effect area difference corresponding to each piece of the audio data.

9. The method according to claim 8, wherein the determining a relative movement state corresponding to each piece of the audio data according to the Doppler-effect area difference corresponding to each piece of the audio data comprises:
when the Doppler-effect area difference corresponding to the audio data is larger than a first threshold, determining that the relative movement state between the electronic device and the object corresponding to the audio data is relatively approaching.

10. The method according to claim 8, wherein the determining a relative movement state corresponding to each piece of the audio data according to the Doppler-effect area difference corresponding to each piece of the audio data comprises:
when the Doppler-effect area difference corresponding to the audio data is smaller than a second threshold, determining that the relative movement state between the electronic device and the object corresponding to the audio data is relatively distancing.

11. The method according to claim 1, wherein the adjusting the volume of the ringing according to the distance change comprises:
in response to the change of the distance being distance decreasing, decreasing the volume of the ringing; and
in response to the change of the distance being distance increasing, increasing the volume of the ringing.

12. The method according to claim 11, wherein the in response to the change of the distance being distance decreasing, decreasing the volume of the ringing; and in response to the change of the distance being distance increasing, increasing the volume of the ringing comprises:

acquiring a movement direction of the object relative to the electronic device;

in response to the movement direction being a preset direction and the change of the distance being distance decreasing, decreasing the volume of the ringing; and in response to the movement direction being a preset direction and the change of the distance being distance increasing, increasing the volume of the ringing.

13. The method according to claim 12, further comprising:

in response to the movement direction being not the preset direction, determining whether the distance change is first increasing and then decreasing; and in response to the distance change being first increasing and then decreasing, setting the volume of the ringing to be a mute volume.

14. The method according to claim 1, after the adjusting the volume of the ringing according to the change of the distance, further comprising:

determining whether the volume of the ringing of the electronic device is a mute volume; and in response to the volume of the ringing of the electronic device being a mute volume, ending the present operation of adjusting the volume of the ringing according to the change of the distance.

15. The method according to claim 14, after the in response to the volume of the ringing of the electronic device being a mute volume, ending the present operation of adjusting the volume of the ringing according to the change of the distance, further comprising:

determining whether the change of the distance between the electronic device and the object; and in response to the change of the distance being first decreasing and then increasing, determining that the electronic device is in a vibrating mode, and turning off the vibrating mode of the electronic device.

16. The method according to claim 15, after the turning off the vibrating mode of the electronic device, further comprising:

determining whether the change of the distance between the electronic device and the object is monitored;

in response to the change of the distance between the electronic device and the object being monitored, determining whether the change of the distance remains being constant; and in response to the change of the distance remaining being constant, hanging up an incoming call of the electronic device.

17. The method according to claim 14, further comprising:

in response to the volume of the ringing of the electronic device being not a mute volume, acquiring a next piece of audio data, and returning performing the operation of determining the change of the distance between the electronic device and the object according to the audio data.

18. An electronic device, comprising:
one or more processor;
a memory;
an ultrasonic transmitting apparatus and an ultrasonic receiving apparatus; and
one or more application program;
wherein the one or more application program is stored in the memory and configured to be executed by the one or more processor, and the one or more application program is configured to execute a method comprising:
in response to monitoring that the electronic device outputs ringing, acquiring audio data of an ultrasonic signal received by the ultrasonic receiving apparatus, wherein the ultrasonic signal is a signal that is transmitted by the ultrasonic transmitting apparatus and returns after being reflected by an object;
determining a change of a distance between the electronic device and the object according to the audio data; and
adjusting a volume of the ringing according to the change of the distance;
wherein adjusting the volume of the ringing according to the change of the distance comprises:
determining a distance-change value corresponding to the change of the distance; and
adjusting the volume of the ringing according to the distance-change value, comprising:
determining a target volume corresponding to the change value of the distance between the electronic device and the object according to a preset corresponding relationship between the distance-change value and the volume, and adjusting the volume of the ringing according to the target volume.

19. A non-transitory computer-readable storage medium, wherein the non-transitory computer-readable storage medium stores program codes therein, wherein the program codes is capable of being called by a processor to execute a method comprising:

in response to monitoring that an electronic device ultrasonic comprising an ultrasonic transmitting apparatus and an ultrasonic receiving apparatus outputs ringing, acquiring audio data of an ultrasonic signal received by the ultrasonic receiving apparatus, wherein the ultrasonic signal is a signal that is transmitted by the ultrasonic transmitting apparatus and returns after being reflected by an object;

determining a change of a distance between the electronic device and the object according to the audio data; and adjusting a volume of the ringing according to the change of the distance;

wherein adjusting the volume of the ringing according to the change of the distance comprises:
determining a distance-change value corresponding to the change of the distance; and
adjusting the volume of the ringing according to the distance-change value, comprising:
determining a target volume corresponding to the change value of the distance between the electronic device and the object according to a preset corresponding relationship between the distance-change value and the volume, and adjusting the volume of the ringing according to the target volume.

\* \* \* \* \*